May 1, 1951          K. E. BEMIS          2,550,758
FRENCH FRYER
Filed Dec. 23, 1946
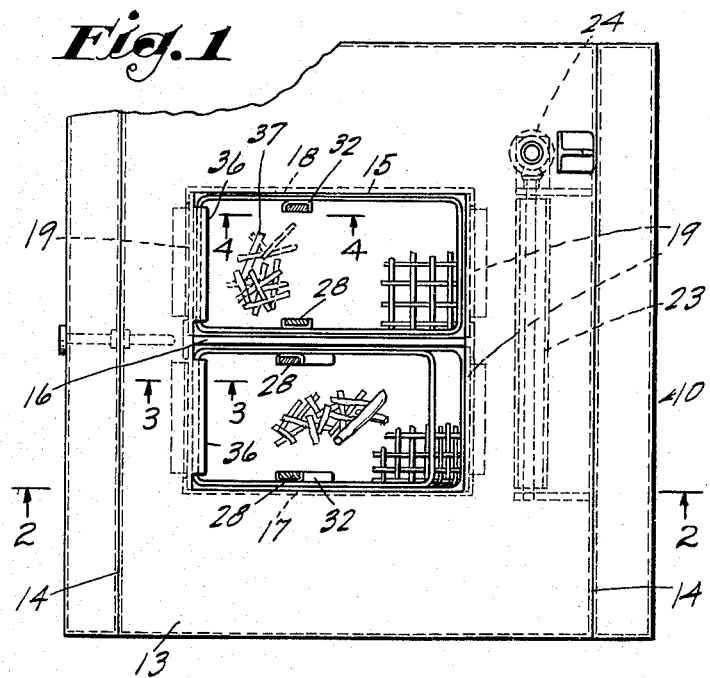
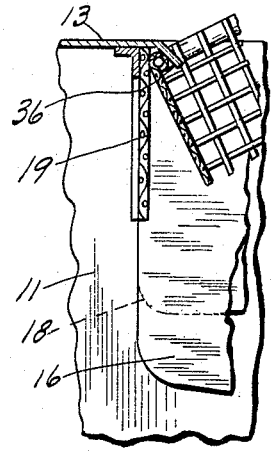
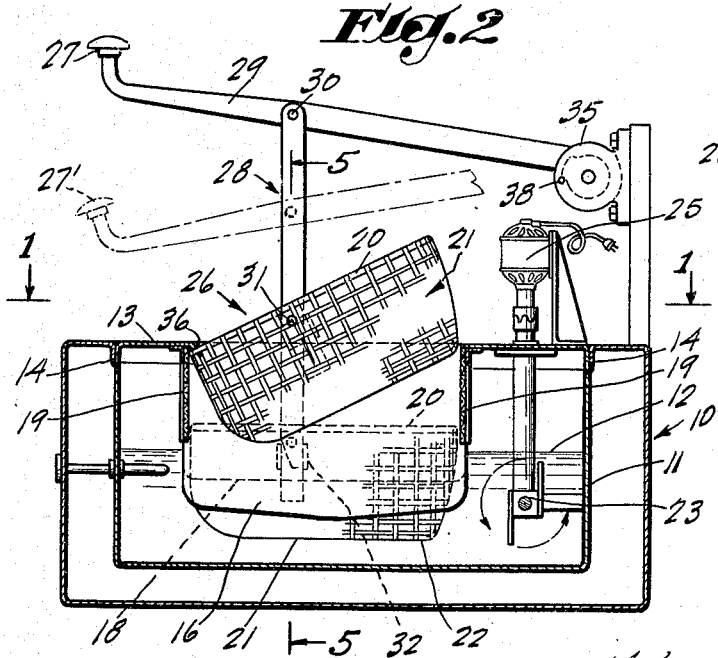
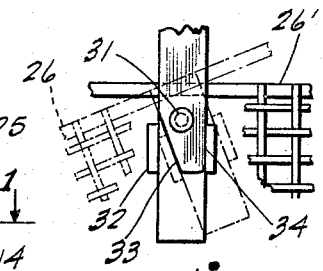
INVENTOR.
Kenneth E. Bemis
BY
Philip A. Tindall
Attorney Patented May 1, 1951

2,550,758

UNITED STATES PATENT OFFICE 2,550,758

FRENCH FRYER

Kenneth E. Bemis, Oakland, Calif.

Application December 23, 1946, Serial No. 717,877

7 Claims. (Cl. 99—410)

This invention relates to improvements in deep-fat fryers particularly those used for cooking French fried and shoe-string potatoes, and provides apparatus which maintains the main body of fat free of particles of potatoes to be, or being fried, because the containers or baskets for the potato strips are so arranged as to make it impossible for any of the strips to bypass the baskets to reach the main body of fat. The baskets maintain a complete closure for the main body of fat at all times, during and including the intervals between cooking periods, there never being any opening through which a strip of potato can bypass the baskets.

With conventional French fryers, containers such as woven wire baskets are used, but they usually lift entirely out of the openings provided for them, and whether raised or lowered there is always ample space for strips of potato to bypass them. These strips or portions remain in the hot fat until such time as the fat container or vessel is cleaned and consequently they char to a crisp, causing pollution of the fat and a scorched flavor which reduces the delectability of the French fried or shoe-string potatoes.

My invention overcomes such disadvantages of conventional French fryers, through controlled handling of the baskets which limit the lift, and by forming the openings for the baskets to just clear their peripheries, and by providing walled compartments into which the baskets are lowered.

The objects and advantages of the invention are as follows:

First, to provide a French fryer which is devoid of passages through which potato strips can bypass the containers for the strips.

Second, to provide a French fryer with walled compartments into which the containers are lowered with the walls of the compartments just clearing the peripheries of the containers.

Third, to provide a French fryer as outlined with means for limiting the lift of the baskets to a point where no direct passage is provided to the main body of fat.

Fourth, to provide a French fryer as outlined with lifting and associated means which lowers and raises the containers on an even keel and which tips the containers forward through the terminal portion of the lift for convenience in removing the fried potatoes, and returns the container to an even keel during the initial lowering movement.

In describing the invention reference will be made to the accompanying drawings in which:

Fig. 1 is a plan view of the invention with the lifting yoke shown in section and compares to a section taken on line 1—1 of Fig. 2.

Fig. 2 is a section taken on line 2—2 of Fig. 1.

Fig. 3 is an enlarged fragmentary sectional view of the tipping means for the baskets showing the compartment side walls and front screen and corresponds to a section taken on line 3—3 of Fig. 1.

Fig. 4 shows an enlarged fragmentary view of one of the basket leveling means looking in the direction 4—4 of Fig. 1.

Fig. 5 is a broken fragmentary sectional elevation of the basket bail and corresponds to a section taken along 5—5 of Fig. 2.

This invention is related to my copending application Serial No. 717,878 filed December 23, 1946, which issued on December 21, 1948, as Patent No. 2,456,810, for French Frying Apparatus, and includes a cabinet 10 in which is supported a container 11 for the frying oil or fat 12. A cover 13 is removably supported in this container as indicated at 14 and this cover has an opening 15 from which depends a central partition 16 dividing the opening into two compartments having the respective side walls 17 and 18 and which partition and side walls extend downwardly into the bath 12 to form a pair of channels for circulation of the fat, and a screen 19 depends from the cover at each, the front and rear end, of each compartment and extends to a level below the top 20 of the basket 21 when it is in its lowered position indicated at 22.

The baskets are constructed of foraminous material, generally of woven wire with a mesh as large as possible without permitting passage of a potato strip, so that the pulsative circulating means shown at 23 can drive the hot fat forwardly into and through the basket and withdraw a part with each revolution, the paddle wheel being driven through bevel gears 24 by a motor 25, this feature being claimed in the copending application previously mentioned.

The baskets have only passing clearance within the compartments, and fit close enough all around so that even shoe-string strips cannot pass between the basket and either wall or screen, irrespective of whether the basket is in a raised position indicated at 26 or a lowered position indicated at 22, or whether the two baskets are in the two opposite positions.

The baskets are manually lowered by pressing the handle 27 down to the position 27'. The bail 28 is pivoted to the operating lever 29 at 30 and the two arms of the bail are pivotally secured on the inside of the basket as indicated at 31 within stop members 32 which permit the basket to tip forward as shown at 26 in Fig. 2 but which maintains the basket on an even keel after the top of the basket has been lowered to the level of the cover 13, the element 32 being channel shaped, and at least one of the bail arms being biased as indicated at 33 to permit the basket to tip forward but being stopped from tipping in the opposite direction by the straight side 34, the tipped position of the basket being indicated at 26 in Figs. 2 and 4, and the even keel or level position at 22 and 26'.

The lever 29 is operated to raise the basket by suitable combined timing and operating means indicated at 35 which raises the lever and the basket after a predetermined time-elapse period. This timing and operating means may be of any suitable type and does not form a part of this invention.

A lip 36 is provided at the forward end of each compartment to engage the front of the basket as it is lifted to cause the basket to tip forward so that the fried potatoes 37 will gather at the forward end of the basket for convenient removal when the basket has been raised to its maximum height.

It will be noted that the baskets fit very closely within the compartments, having just sufficient clearance to prevent binding or holding, and that this close fit is maintained during the raising and lowering movements, when the basket is in its lowest position as well as in its highest position, there never being any space sufficiently large to pass even strips of the smallest cross-section, that the baskets are automatically tipped forward during the final raising movement and remain so for removing the potatoes, and upon lowering, the basket is initially returned to a level position and lowered in that level position to the lowermost position. The pin 38 limits the height to which the lever 29 can be raised.

I claim:

1. A French fryer comprising: a fat receptacle having a front wall and a cover; said cover having an opening of less extent than said receptacle and opening thereinto and having a lip projecting inwardly from the front of the opening, and depending front, back and side walls surrounding said opening; a basket having straight front and side walls, and a curved back wall having its axis at the top of the front wall; said basket being slidable within the confines of said front, back and side walls surrounding said opening and with the top of the front wall of the basket engaging the underside of said lip and the rear end of the basket swinging about the fulcrum formed by said lip and maintaining the opening closed during tilting of the basket while raising to a predetermined elevation, whereby upon raising the basket the contents are gathered at the front of the basket and the opening is maintained closed against entrance of extraneous material.

2. A structure as defined in claim 1; a bail for said basket and being pivoted at the upper end forwardly of the longitudinal center of the basket and including stop means for limiting the tilt and consequently the degree of raising of the basket, and second stop means to limit righting of the basket to a level position when the basket is lowered.

3. A structure as defined in claim 1; said front, back and side walls surrounding said opening comprising solid side walls and foraminous front and back walls for limiting circulation of fat through the basket to one direction.

4. A structure as defined in claim 1: a bail for said basket and being pivoted at the upper end forwardly of the longitudinal center of the basket and including stop means for limiting the tilt and consequently the degree of raising of the basket, and second stop means to limit righting of the basket to a level position when the basket is lowered; said front, back and side walls surrounding said opening comprising solid side walls and foraminous front and back walls for limiting circulation of fat through the basket to one direction.

5. A French fryer comprising: a receptacle having a cover having an opening having a front end with a lip projecting inwardly; a dependent side wall on each side of said opening and a dependent screen at each, the front and back of said opening; a basket slidable between said dependent walls and screens with the front end of the basket engageable with said lip to fulcrum thereabout when the rear end of the basket is raised through the opening, and with the back wall of the basket formed to an arc having its axis at said fulcrum to maintain the opening closed against entrace of extraneous material to the receptacle when the basket is raised to a tilted position with the lower portion of the rear end of the basket coincident with the cover at the rear end of the opening.

6. A structure as defined in claim 5; a bail pivotally attached to the sides of said basket forward of the center thereof, and stop means cooperative between the bail and the basket to limit forward tilt when the basket is raised, and second stop means cooperative between the basket and the bail for limiting reverse tilting of the basket to a level position.

7. A structure as defined in claim 5; a lever pivotally supported at one end and having said bail pivotally supported intermediate thereof; said lever being movable to two positions for respectively raising and lowering said basket.

KENNETH E. BEMIS.

REFERENCES CITED

The following references are of record in the file of this patent:

UNITED STATES PATENTS

| Number | Name | Date |
|---|---|---|
| 217,378 | Hodges | July 8, 1879 |
| 670,296 | Richardson | Mar. 19, 1901 |
| 1,198,374 | Overbury | Sept. 12, 1916 |
| 1,277,158 | Wall | Aug. 27, 1918 |
| 1,576,321 | Gasser | Mar. 9, 1926 |
| 2,004,500 | Brunelle | June 11, 1935 |
| 2,078,719 | Roach | Apr. 27, 1937 |
| 2,097,471 | Scharsch | Nov. 2, 1937 |
| 2,109,212 | Ehrgott | Feb. 22, 1938 |
| 2,175,531 | Kortum | Oct. 10, 1939 |
| 2,222,314 | Husk | Nov. 19, 1940 |